Feb. 14, 1939.                 J. C. CROWLEY                 2,147,153
                                 VALVE STEM
                         Original Filed March 26, 1934

INVENTOR.
BY   JOHN C. CROWLEY
     Kwis Hudson & Kent
                    ATTORNEYS Patented Feb. 14, 1939

2,147,153

UNITED STATES PATENT OFFICE 2,147,153

VALVE STEM

John C. Crowley, Cleveland Heights, Ohio, assignor to The Dill Manufacturing Company, Cleveland, Ohio, a corporation of Ohio Original application March 26, 1934, Serial No. 717,327, now Patent No. 2,094,264, dated September 28, 1937. Divided and this application March 10, 1937, Serial No. 130,052

1 Claim. (Cl. 137—69.1)

This invention relates to a valve stem and valve for inflatable articles such for example as pneumatic tires.

This application is a division of application Serial No. 717,327, filed March 26, 1934, and now Patent No. 2,094,264, granted Sept. 28, 1937.

An object of the invention is to provide a combined valve stem and valve that is so constructed as to eliminate the use of separate valve insides and valve springs in the stem.

Another object is to provide a combined valve stem and valve such as above specified, which is constructed in its major part of molded rubber.

A further object is to provide a combined valve stem and valve structure which comprises a minimum number of parts that will not readily wear out or become inoperative and, in fact, will last for the life of the tire tube to which it is attached.

Figure 1:
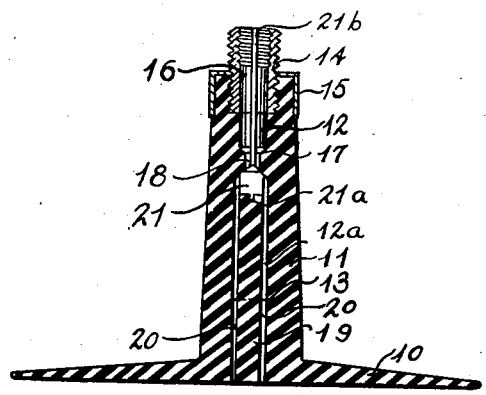

Further and additional objects and advantages will become apparent hereinafter during the following description of an embodiment of the invention which is illustrated in the accompanying drawing wherein, Fig. 1 is a sectional view on a somewhat enlarged scale of one form of valve stem and valve embodying the present invention.

Figure 2:
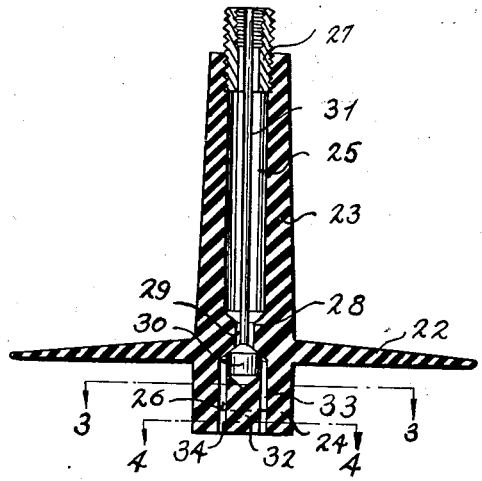
Figure 3:
Figure 4:

Fig. 2 is a sectional view similar to Fig. 1 but illustrating a different form of valve stem and valve from that shown in Fig. 1, and Figs. 3 and 4 are sectional views taken respectively on lines 3—3, and 4—4 of Fig. 2 looking in the direction of the arrows.

The valve stem and valve shown in Fig. 1 comprises a base 10 and an integral stem proper 11, the base 10 and stem proper 11 being formed of molded rubber. The valve stem is adapted to be secured to a tire tube or other inflatable rubber article by vulcanizing the base 10 in the proper position upon the exterior of the tube. The stem can be vulcanized and cured in position upon the tube during the curing of the latter and becomes, in effect, an integral structure therewith. The stem 11 is provided with a bore 12 extending from adjacent the outer end of the stem inwardly toward its inner end to the point 13. The outer end of the bore 12 communicates with a counterbore formed in the stem and which is provided with a threaded metal insert 14 that is clamped in the counterbore by means of a metal ferrule 15 and which extends beyond the outer end of the stem, said metal insert being provided with a passage 16 therethrough that is in communication with the bore 12. The stem proper 11 is provided intermediate the ends of the bore 12 with an integral inwardly extending annular projection 17 that has its inner and outer faces of oppositely disposed conical formation, with the inner face of the projection forming a conical valve seat for engagement with a conical valve later to be referred to. The projection 17 provides a restricted opening 18 intermediate the ends of the bore 12. The stem proper 11 is provided with an integral internal portion 19 molded therein and extending from the flat face of the base 10 upwardly of the stem and into the bore 12. The internal portion 19 is connected to the stem from the inner face of the base to the point 13, but that part of the portion 19 which extends into the bore 12 and lies outwardly of the point 13 is completely surrounded by an annular space 12a defined by the wall of the bore 12 and the outer circumference or periphery of the portion 19, it being understood that the portion 19 is of less diameter than the diameter of the bore 12. Below the point 13 the stem is provided with slots 20 lying outwardly of the portion 19 and extending downwardly to the inner face of the base, said slots thus acting to place the bore 12 and the annular space 12a in communication with the tube or article to which the stem is connected. A conical valve 21 is arranged in the bore 12 below the projection 17 and is adapted to seat on the conical face of said projection to seal the opening 18 and stop the passage of air through the bore 12. The lower side of the valve 21 abuts the outer end of the portion 19 and is provided with a rib 21a that seats in a transverse groove formed in the outer end of the portion 19. The valve 21 has extending from its outer end a valve pin 21b that passes through the opening 18, the bore 12 and through the passage 16 in the insert 14 and terminates adjacent the outer end of the insert.

In mounting the valve 21 in the stem the valve is forced inwardly of the stem from the outer end thereof through the restricted opening 18 defined by the internal projection 17, it being understood that since the stem is formed of rubber said projection may be sufficiently distorted, under force, to increase the size of the opening and to allow the valve to be pushed therethrough. The rib 21a on the lower side of the valve will engage in the slot in the outer end of the internal portion 19 of the stem and the valve and said portion will then move together. Although the valve may be pushed through the opening defined by the projection 17, it will be understood that when once mounted the air pressure will not be sufficient to force the valve outwardly through said opening and that the conical valve will bear against the complementary conical seat afforded by the under side of the projection 17 and thus seal the passageways through the stem.

When the stem is mounted on an inflatable article such as a tire tube, an air chuck or other fitting on an air line can be applied to the outer end of the insert 14 and the valve pin 21b depressed to cause an unseating of the valve 21 and a compression of the internal portion 19 of the stem, to thus provide an uninterrupted air passageway through the stem, including the passage 16, bore 12, opening 18 and slots 20. When the tube or article has been properly inflated removal of the air chuck allows the portion 19 which has been compressed to assume its normal position with the valve in sealing engagement with the seat on the projection 17. Of course an air gauge or other device could be applied to the outer end of the insert and the valve moved off its seat in a similar manner.

In Figs. 2, 3 and 4 a different form of the invention is disclosed from that shown in Fig. 1. In this second form of the invention the valve stem comprises a base 22, from which centrally project in opposite directions a relatively long valve stem 23 and a relatively short valve stem 24, the latter stem being arranged on the inner or flat side of the base. It will be understood that the stems and base constitute an integral structure formed of molded rubber. The stem 23 is provided with a longitudinally extending relatively large bore 25 that reaches from adjacent the outer end of the stem 23 and continues on into the stem 24 to the point 26. The outer end of the bore 25 terminates at a counterbore in which is located and secured a metal insert 27, similar to the insert 14 described in connection with Fig. 1. The stem 23 at its lower end and adjacent the base 22 is provided with an integral internal annular projection 28 molded therein and separating the portions of the bore 25 that are in the long stem 23 and the short stem 24, said projection defining a restricted opening 29 placing the parts of the bore 25 in communication. The opposite ends of the projection 28 are formed with oppositely disposed conical surfaces, the lower of which constitutes a valve seat for a conical valve 30 which has its opposite ends of conical formation and from one of which a valve pin 31 extends through the restricted opening 29 and through the bore 25 into the metal insert 27 terminating adjacent the outer end of said insert. The short stem 24 has an internal portion 32 molded therein and extending centrally thereof and projecting beyond the point 26 into the bore 25, that part of the portion 32 which projects beyond the point 26 being surrounded by an annular space 33 defined by the wall of the bore 25 and the outer periphery of the portion 32, it being understood that the portion 32 is of less diameter than the diameter of the bore 25. Arcuate slots 34 are formed in the short stem 24 at diametrically opposite sides of the portion 32 and extend from the point 26 to the inner end of the short stem 24 and thus act to place the bore 25 in communication with the interior of the tire tube or article to which the stem is applied, it being understood that the short stem 24 projects through an opening in the tube or article and that the lower flat side of the base 22 engages the exterior of the tube or article and is secured or vulcanized thereto. The outer end of the portion 32 that extends into the bore 25 is provided with a conical depression into which seats the conical end of the valve 30 that is opposite to the end carrying the valve pin 31. It will be understood that the valve 30 is forced through the restricted opening 29 in the same manner as was the valve 21 described with reference to the construction shown in Fig. 1, and that in the inflation or deflation of the article to which the stem is attached the functioning of the parts will be similar to the functioning of the parts of Fig. 1 as previously described.

It will be noted that in both forms of the invention shown herein the passageways for the air through the stem are of ample magnitude to allow quick inflation and deflation of the tube and that the valve seat and stem being one integral molded structure is sturdy and will last for the life of the tube or article. A combined valve stem and valve such as has just been described possesses the advantage of being inexpensive, inasmuch as it eliminates the necessity of the use of separate valve insides and valve springs in the stem. Also the stem possesses the useful function of a rubber stem, in that it can pull through the rim opening in the case of quick deflation of the tire tube such as occurs with a puncture or blow-out. Additionally, the form of stem shown in Fig. 2 possesses the advantage due to having the short valve stem 24 on the underside of its base, that it can be properly centered and located with respect to the opening in the tire tube or article when being applied thereto.

Although two embodiments of the invention have been illustrated and described herein, it should be understood that the invention is susceptible of various modifications and adaptations within the scope of the appended claim.

Having thus described my invention I claim:

A combined valve and valve stem comprising a molded rubber stem having a base adapted to be attached to a tire tube, said stem extending in opposite directions from the center of said base and being provided with a bore extending from the outer end of the stem to adjacent its inner end, a rubber portion integrally molded in said stem and closing the inner end of said bore and extending into the latter, a slot formed in said stem adjacent said portion and extending from said bore to the inner end of said stem, means integral with the stem intermediate the ends of said bore forming a restricted opening and a seat, and valve means carried by said portion and normally held seated thereby against said seat to seal the opening.

JOHN C. CROWLEY.